United States Patent [19]

Yamauchi

[11] 3,833,472

[45] Sept. 3, 1974

[54] PROCESS FOR ISOLATING OLEANDRIN FROM NERIUM ODORUM

[75] Inventor: Tatsuo Yamauchi, Fukuoka, Japan

[73] Assignee: Hisamitsu Pharmaceutical Company, Inc., Tosu-City, Japan

[22] Filed: Sept. 25, 1972

[21] Appl. No.: 291,529

[30] Foreign Application Priority Data

Oct. 3, 1971 Japan.............................. 46-77254
Oct. 3, 1971 Japan.............................. 46-77255
May 8, 1972 Japan.............................. 47-45697

[52] U.S. Cl. ............................................. 195/3
[51] Int. Cl. ............................................. C12b
[58] Field of Search ............... 195/1, 2, 3, 4, 32, 7; 424/195

[56] References Cited

FOREIGN PATENTS OR APPLICATIONS 1,000,014  8/1965  Great Britain........................ 195/2
124,460   4/1938  Japan.................................. 124/195

*Primary Examiner*—A. Louis Monacell
*Assistant Examiner*—R. B. Penland
*Attorney, Agent, or Firm*—Browdy & Neimark

[57] ABSTRACT

Undried leaves of Nerium odorum are subjected to a heat treatment under dry or wet conditions or incubation under heating to isolate oleandrin therefrom, which is then extracted with a solvent to obtain oleandrin of a high purity.

3 Claims, No Drawings

PROCESS FOR ISOLATING OLEANDRIN FROM NERIUM ODORUM

FIELD OF THE INVENTION

The present invention relates to oleandrin and, more particularly, a process for isolating oleandrin from Nerium odorum.

BACKGROUND OF INVENTION

Both Nerium odorum SO1 and Nerium oleander Linn belong to genus Nerium of Family Apocynaceae. The leaves of these plants contain oleandrin, useful as medicine, of the following structural formula:

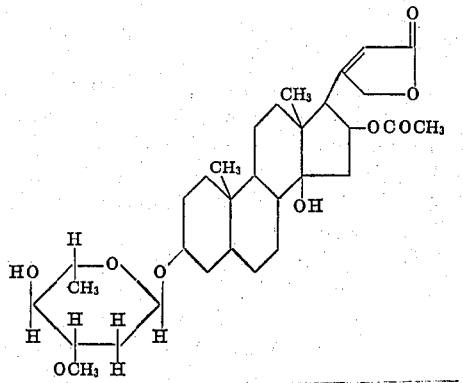

It has been known widely that oleandrin has excellent cardiotonic and diuretic activity. Various investigations have been developed for this reason.

In Japanese Pat. No. 124,460, a process for isolating this active component from Nerium odorum is disclosed which comprises stirring leaves of Nerium odorum together with water or aqueous alcohol to extract the component, reextracting the extract with a solvent such as chloroform and precipitating the product therefrom to obtain oleandrin. Recently, a process for obtaining oleandrin comprising treatment with a lead salt and a process comprising treatment with a suitable combination of several solvents have been proposed.

However, according to these processes, the resulting oleandrin crystals still contain impurities and the final oleandrin preparations are turbid (white). Another serious disadvantage of these prior processes is the yield of oleandrin is very low and the processes are, accordingly, of only a poor practical value.

SUMMARY OF THE INVENTION

It has now been surprisingly found that if leaves of Nerium odorum are dried naturally, the yield of oleandrin obtained therefrom is low, but that if undried leaves of Nerium odorum are subjected to a heat treatment under dry or wet conditions or subjected to an incubation treatment whereby oleandrin is isolated by enzymatic reaction of the native glycoside contained in Nerium odorum, the yield is dramatically improved. By successive extraction treatments, oleandrin can thus be obtained in a quite high yield and purity. Futher, oleandrin can be obtained also in a high yield and purity by isolating the native glycoside from undried Nerium odorum followed by an enzymatic treatment. Accordingly, the present invention relates to a process for isolating oleandrin from undried leaves of Nerium odorum by heating and extracting the product with a solvent.

It is, accordingly, an object of the invention to overcome the deficiencies of the prior art.

It is another object of the present invention to provide high purity oleandrin in high yields.

Another object of the invention is to extract and thereby to separate oleandrin in a high yield from undried leaves of Nerium odorum.

Another object of the invention is to extract and thereby to separate oleandrin in a high yield directly from undried leaves of Nerium odorum in a simple manner.

DETAILED DESCRIPTION OF EMBODIMENTS OF THE INVENTION

As the heat treatment according to the present invention, any heating technique under dry or wet conditions or mild heat treatment by incubation may be used to isolate oleandrin in a high yield easily from tissue of Nerium odorum.

The heat treatment under dry or wet conditions is carried out, for example, as follows: Leaves of Nerium odorum are heated at a temperature above 60°C. and the product of this treatment is extracted with water, an organic solvent or a mixture of water and organic solvent, and oleandrin is isolated from the extract. Thus, oleandrin is separated from Nerium odorum and thereby purified to a high purity in a high yield.

The fresh leaves of Nerium odorum may be subjected to the heat treatment directly or after they are allowed to stand for a while or even after being air-dried slightly. The airdrying is effected generally at room temperature of 10° – 15°C. The effect of successive heat treatment can be obtained within 4 – 7 days of air drying. The effective extraction of oleandrin can not be performed, even according to the heat treatment of the invention, if air-drying is effected for 11 or more days.

The heat treatment is preferably effected by heating under dry conditions, e.g., using dry air, at about 60° – 170°C., by hot water treatment at about 60° – 100°C. or by vapor treatment, e.g., steam, under atmospheric or higher pressure at about 60° – 170°C. These techniques may be employed alone or they may be combined. Time of the treatment ranges from a moment to 3 hours, preferably from 20 minutes to 1 hour.

The leaves of Nerium odorum may be cut into pieces prior to the heat treatment. However, the uncut leaves are convenient for handling.

The following table shows the interrelationship between heating temperatures before and after air-drying and extraction effects of oleandrin.

Table I

| | Drying condition of leaves of Nerium odorum | | |
|---|---|---|---|
| Air-drying condition | Temp. of dry heating treatment | Treating time | Spot of oleandrin by paper chromatography |
| Not dried | 80°C. | 10 mins. | + |
| Not dried | 80°C. | 40 mins. | + |
| Not dried | 50°C. | 40 mins. | − |
| Not dried | 65°C. | 40 mins. | + |
| Not dried | 80°C. | 40 mins. | + |
| Not dried | 125°C. | 40 mins. | + |
| Not dried | 165°C. | 40 mins. | + |
| 4 days | 80°C. | 40 mins. | + |
| 7 days | 80°C. | 40 mins. | + |
| 11 days | 80°C. | 40 mins. | − |

By such a heat treatment, an enzyme contained in the leaves of Nerium odorum reacts on the native glycoside of oleandrin in the leaves to isolate oleandrin hydrolytically. Thus, it is considered that under this treatment the native glycoside is converted into oleandrin in an easily extractable state.

Heat-treated leaves of Nerium odorum prepared under the dry heating technique are directly ground and subjected to the extraction treatment. On the other hand, the leaves which have been treated with hot water, with steam or even wet hot air are preferably air-dried prior to the extraction treatment in order to increase efficiency, although such air-drying treatment is not always necessary.

The leaves of Nerium odorum thus heat-treated and ground are then subjected to an extraction treatment with water, an organic solvent or mixture thereof. As organic solvents, there may be mentioned alcohols such as methanol and ethanol, ethers such as propyl ether, halogenated hydrocarbons such as chloroform. The preferred solvents are water-soluble. Methanol is most preferred from the viewpoint of economization and extraction efficiency.

Oleandrin may be isolated from the resulting extract in the usual manner. For example, the extract is concentrated under reduced pressure, the equivalent quantity of water is added thereto and the mixture is filtered.

Thereafter, the filtrate is reextracted with benzene or methylene chloride followed by concentration under reduced pressure to obtain a pasty residue. A mixture of ethyl acetate/hexane (1 : 1) is added to the residue to precipitate crude crystals, which are then subjected to fractional recrystallization to obtain needles of oleandrin. From the mother liquor, oleandrin and, in addition, adynerin, odoroside A, 16-desacetyl-anhydrooleandrin, oleandrigenin, etc., are obtained separately by column chromatography.

In place of the above described heat-treatment, the process may be carried out by incubation under mild heat of the undried leaves of Nerium odorum according to the invention. First, fresh leaves of Nerium odorum are finely powdered. It is effective to use a pulverizer or grinder to obtain leaf powder. The leaves may also cut into pieces with a cutter.

The thus cut or pulverized leaves of Nerium odorum are mixed with an acidic or neutral buffer solution. Excellent results are obtained by adjusting the buffer solution to about pH 4.0 – 7.0. The buffer solution may be organic, inorganic or mixtures thereof. From the economical viewpoint, buffer solutions of organic acids such as acetic acid, citric acid and phosphoric acid/citric acid mixtures are preferred. With alkaline buffer solutions, the desired effect cannot be expected in the later extraction step, since with a basic pH greater than 7 decomposition of native glycoside with an enzyme cannot be carried out.

The cut or ground leaves of Nerium odorum in the neutral or acid buffered solution are then subjected to the incubation treatment to hydrolyze native glycoside of oleandrin in the leaves with an enzyme contained therein to isolate oleandrin. The incubation treatment is carried out at a temperature in the range of about 25° – 50°C, preferably 30° – 40°C. for from 10 minutes to 10 hours, while the mixture is allowed to stand or is stirred slowly.

This treatment is terminated when the decomposition of native glycoside of oleandrin with enzyme is completed. Conditions depend largely upon variety of Nerium odorum and degree of dryness of the leaves. Therefore, the conditions should be determined each time depending upon conditions of the leaves of Nerium odorum.

An homogenizing treatment may be effected, if desired, prior to or during the incubation, or the incubation may be carried out directly without the homogenizing treatment. The homogenizing treatment can be effected by simply treating the cut leaves in the buffered solution in a homogenizer for a short time, since this treatment is effected only for the purpose of homogenizing the cut leaves.

In the homogenizing treatment, the leaves, immersed in or simply mixed with the buffer solution, are treated with an homogenizer or similar device for a period of from 1 – 3 minutes to about 4 hours. The time is short if fresh leaves are used and a longer time is required if dried leaves are used. Excellent results are obtained if incubation is also effected during this treatment by keeping the temperature at 25° – 50°C.

The cut leaves to Nerium odorum after the incubation treatment under mild heating are filtered, if necessary, and then extracted with water, an organic solvent or a mixture thereof. As organic solvents, there may be used alcohols such as methanol and ethanol, ethers such as propyl ether, or halogenated hydrocarbons such as chloroform, as mentioned above. As with extraction of the heat treated leaves, methanol is most preferred as the solvent from the viewpoint of economization and extraction efficiency.

The heat treatment of undried leaves of Nerium odorum according to the invention also includes incubation of the cut fresh leaves of Nerium odorum or of leaf extract with water or organic solvent with the addition of a β-glucosidase. In this treatment, the leaves of Nerium odorum are first finely powdered. The leaves may be either fresh or slightly dried. The pulverization may be effected by using a pulverizer or grinder. The leaves may be otherwise cut into small pieces with a cutter.

The resultant, finely powdered or cut leaves are directly immersed in water, preferably warm water, or in a buffer solution adjusted to pH 4 – 7 and containing a β-glucosidase; or the leaves are subjected to an extraction treatment and the extract is combined with a β-glucosidase. In either event the mixture is then incubated.

If the leaves are first extracted, this extraction treatment is effected by immersing the finely divided leaves in water, an organic solvent or a mixture thereof. As the organic solvent, there may be used alcohols such as methanol, ethanol, or isopropanol, ethers as mentioned above, or chloroform or other halogenated hydrocarbons. Methanol is most preferred from viewpoint of economization or extraction coefficient. The extraction can be effected at room temperatures but may be promoted by carrying out the same under heating.

A β-glucosidase is added to the immersed, finely powdered leaves or the extract. If a large quantity of the solvent remains in the extract, the enzyme tends to be inactivated. Therefore, the immersion product or the extract is preferably concentrated to remove the solvent to some extent particularly if a large quantity of solvent is initially present and then water or warm water is added thereto prior to the addition of the β-glucosidase to improve the enzymatic action.

The term "β-glucosidase" includes general hydrolases having absolute specificity to β-D-glucopyranoside bond and, all enzymes which belong to β-glucosidase can also be used effectively. As practical enzymes, there may be mentioned emulsin, gentiobiase, cellobiase, cellulase and snail enzyme; other β-glucosidase enzymes are also known and these are effective as well.

A crude β-glucosidase enzyme preparation of 50–150 g. is used per 1 kg. of leaves of Nerium odorum. By incubating the mixture, native glycoside of oleandrin contained in the leaves is hydrolyzed to isolate oleandrin.

The incubating treatment is carried out at a temperature in the range of about 25° – 50°C., preferably 30° – 40°C. for from 10 minutes to 10 hours, while the mixture is allowed to stand or is stirred slowly. This treatment is terminated when the native glycoside of oleandrin is hydrolyzed to oleandrin. The conditions vary largely depending upon variety of Nerium odorum and the degree of dryness of the leaves. Accordingly, the conditions should be determined each time. Oleandrin is isolated from the incubation product according to various known processes.

If oleandrin is to be isolated by direct incubation of the finely powdered leaves, the yield of oleandrin can be increased by first extraction with a solvent followed by purification.

The purification after the incubation is effected, for example, may be carried out as follows: The extract is concentrated under reduced pressure and re-extracted with benzene or methylene chloride. The extract is then concentrated under reduced pressure to obtain a pasty residue. The residue is treated with a mixture of ethyl acetate/hexane (1 : 1) to precipitate crude crystals, which are then subjected to fractional recrystallization to obtain needles of oleandrin.

From the mother liquor of the recrystallization, an additional amount of oleandrin crystals can be further obtained. For example, the isolation of the crystals from the mother liquor of recrystallization can be effected conveniently by conventional column chromatography. The mother liquor is poured into the column to divide it into fractions. The chromatographic procedures with benzene/acetone system or hexane/ethyl acetate system are repeated to isolate the desired substance. Excellent results are obtained if silica gel, alumina or cellulose powder is packed in the chromatographic column and a mixture of hexane/ethyl acetate or mixture of benzene/acetone is used as the developing solvent.

Oleandrin obtained according to the process of the present invention is in the form of white needles of m.p. 253° – 255°C., optical rotation $[\alpha]_D^{20} = -51.2°$ (C=0.05, $CH_3OH$), ultraviolet spectrum $\lambda_{max}^{CH_3CH}m\mu(\epsilon)217(14700)$. Those physical properties of oleandrin coincide with those reported in the literature.

The present invention will be illustrated by way of examples, which by no means limit the invention.

Example 1

Fresh leaves of Nerium odorum just harvested are placed in a drier preheated to 80°C. and subjected to heating at 80°C. for 30 minutes with dry air. Thereafter, the leaves are finely powdered. The finely powdered leaves (1 kg.) are perculated with 15 liters of ethanol. The ethanol layer is collected, concentrated under reduced pressure to about 500 ml. and mixed with the equivalent quantity of water. The insoluble matter is separated by filtration and the filtrate is extracted twice with benzene.

The benzene layers are combined and concentrated under reduced pressure to obtain 7.30 g. of pasty residue. The residue is recrystallized from ethyl acetate/hexane to obtain 1.8 g. of crude crystals. After fractional recrystallization, 0.73 g. of needles of pure oleandrin is obtained.

Thereafter, 5.5 g. of mother liquor of the recrystallization were subjected to column chromatography with silica gel [silica gel × 100 – 200; developing solvent is benzene/acetone (15 : 1 to 5 : 1)].

Respective fractions are subjected repeatedly to chromatographic treatment with benzene/acetone or hexane/ethyl acetate system (1 : 1 to 1:2).

Thus, 0.59 g. of pure oleandrin crystals are obtained. Yield: 0.13%.

Oleandrin obtained in this manner has a quite high purity. The effects are as shown in the following table.

Table II

| | Oleandrin | Digitoxin (a product of Wako Jun'yaku Co., Ltd.) |
|---|---|---|
| Cardiac still-stand dose by frog method (Nichi-yakurisi 60, 218–225, (1964)) (Nuki-method) | 0.6 mg/kg | 0.7 mg/kg |
| Lethal dose by Hatcher (Brody Magnus method (cat) | 0.40 mg/kg | 0.65 mg/kg |
| Pigeon method according to Japanese Pharmacopoeia (Ed. 8) | 0.36 mg/kg | 0.55 mg/kg |

Example 2

Three kilograms of fresh leaves of Nerium odorum are ground with a grinder and mixed with 6 liters of phosphoric acid/citric acid buffer solution of pH 5.0. The mixture is homogenized with a homogenizer within a short period of time and allowed to stand at 40°C. for 3 hours to effect incubation. The mixture is filtered and the residue is extracted with ethanol three times. The extracts are combined together and concentrated to about 300 ml. The equivalent quantity of water is added thereto and insoluble matter is removed. The mixture is extracted with benzene three times and the benzene layer is taken. After evaporating the solvent, 8.81 g. of benzene extract are obtained. This product is recrystallized from ethyl acetate/hexane to obtain 970 mg. of oleandrin. The solvent is evaporated from the mother liquor of recrystallization to obtain 7.47g. of residue. The residue is subjected to silica gel column chromatography [Kanto silica gel × 50, 400 g; developing solvent is benzene/acetone (15 : 1 to 5 : 1)] to obtain 1.57 g. of oleandrin fraction. The product is recrystallized from ethyl acetate/hexane to obtain 685 mg. of oleandrin. Yield was as high as 0.22 percent based on the fresh leaves.

Oleandrin obtained in this manner has a quite high purity. The effects are as shown in Table II, above.

Example 3

Three kilograms of fresh leaves of Nerium odorum are ground with a grinder and extracted with methanol three times. The extracts are combined together and concentrated to about 300 ml. The equivalent quantity of water is added thereto and insoluble matter is removed. The mixture is extracted with chloroform three times and the chloroform layer is taken. After concentration under reduced pressure, 800 ml. of b 30 % are poured therein and 300 g. of crude enzyme of β-glucosidase (BG-1, a product of Amano Pharmaceutical Co. Inc.) are added. The whole is incubated at 40°C. for 3 hours. Thereafter, benzene extraction is effected three times. Benzene layer is taken and the solvent is distilled out therefrom to obtain pasty benzene extract. The extract is recrystallized from ethyl acetate/ hexane to obtain 750 mg. of oleandrin. The solvent is distilled out from the mother liquor of the recrystallization to obtain residue, which is subjected to silica gel chromatography [silica gel × 50, 400 g: developing solvent is benzene/acetone (15 : 1 to 5 : 1)] to obtain a fraction of oleandrin. The fraction is recrystallized from ethyl acetate/hexane to obtain 250 mg. of oleandrin. Yield was 0.033% based on the dry leaves. Oleandrin thus obtained according to the process of the present invention has a quite high purity and pharmacological effects thereof are as shown in Table II.

It will be obvious to those skilled in the art that various changes may be made without departing from the scope of the invention and the invention is not to be considered limited to what is described in the specification.

What is claimed is:

1. A process for preparing oleandrin from nerium odorum, which comprises
   heat-treating undried leaves of nerium odorum with dry heat at 60 – 170°C. for 20 – 60 minutes to isolate oleandrin, and
   extracting said isolated oleandrin from said heat-treated leaves with a solvent.

2. A process in accordance with claim 1 wherein said solvent is selected from the group consisting of water, methanol, ethanol and mixtures thereof.

3. A process according to claim 1 wherein the solvent for extraction of oleandrin is selected from the group consisting of water, methanol, ethanol, isopropyl alcohol, ethers, halogenated hydrocarbons, and mixtures thereof.

* * * * *